United States Patent
Leinonen

(10) Patent No.: US 10,329,649 B2
(45) Date of Patent: Jun. 25, 2019

(54) AUSTENITIC STAINLESS STEEL PRODUCT AND A METHOD FOR MANUFACTURING SAME

(75) Inventor: Jouko Leinonen, Li (FI)

(73) Assignee: SOLU STAINLESS OY, II (FI)

(*) Notice: Subject to any disclaimer, the term of this patent is extended or adjusted under 35 U.S.C. 154(b) by 762 days.

(21) Appl. No.: 14/373,078

(22) PCT Filed: Jan. 20, 2012

(86) PCT No.: PCT/FI2012/050051
§ 371 (c)(1),
(2), (4) Date: Aug. 5, 2014

(87) PCT Pub. No.: WO2013/107922
PCT Pub. Date: Jul. 25, 2013

(65) Prior Publication Data
US 2014/0338800 A1 Nov. 20, 2014

(51) Int. Cl.
*C22C 38/58* (2006.01)
*C22C 38/44* (2006.01)
(Continued)

(52) U.S. Cl.
CPC ........... *C22C 38/58* (2013.01); *C21D 1/42* (2013.01); *C21D 6/004* (2013.01); *C21D 8/005* (2013.01);
(Continued)

(58) Field of Classification Search
CPC ........ C21D 8/0236; C21D 8/005; C22C 38/18
See application file for complete search history.

(56) References Cited

U.S. PATENT DOCUMENTS 3,615,365 A * 10/1971 McCunn ................. C22C 38/58
420/58
3,917,492 A * 11/1975 Backman ................ C22C 38/44
148/610
(Continued)

FOREIGN PATENT DOCUMENTS

CN 101835918 A 9/2010
EP 1036853 A1 9/2000
(Continued)

OTHER PUBLICATIONS

Office Action issued in corresponding Chinese Patent Application No. 201280071629.4 dated Sep. 14, 2015 (with an English translation).
(Continued)

*Primary Examiner* — Colleen P Dunn
*Assistant Examiner* — Jeremy C Jones
(74) *Attorney, Agent, or Firm* — Birch, Stewart, Kolasch & Birch, LLP

(57) ABSTRACT

A steel product, such as a strip, plate, sheet, bar or wire, manufactured from austenitic stainless steel. A steel product, wherein: a—the average grain size of the recrystallized austenitic structure of said product is at most 6 μm, b—less than 50% of the structure of said product is non-recrystallized austenite c—the yield strength (Rpo.2) is at least 350 MPa, d—the tensile strength (Rm) is at least 600 MPa, and e—the uniform elongation (Ag) of said product is at least 5%, depending on the strength. The invention also relates to a method.

11 Claims, 1 Drawing Sheet

(51) Int. Cl.
| | |
|---|---|
| C21D 8/00 | (2006.01) |
| C21D 6/00 | (2006.01) |
| C21D 8/02 | (2006.01) |
| C21D 9/46 | (2006.01) |
| C21D 9/52 | (2006.01) |
| C21D 1/42 | (2006.01) |
| C22C 38/40 | (2006.01) |
| C22C 38/00 | (2006.01) |
| C22C 38/02 | (2006.01) |
| C22C 38/42 | (2006.01) |
| C22C 38/34 | (2006.01) |
| C21D 7/02 | (2006.01) |
| C21D 8/06 | (2006.01) |

(52) U.S. Cl.
CPC ......... *C21D 8/0236* (2013.01); *C21D 8/0247* (2013.01); *C21D 8/0273* (2013.01); *C21D 9/46* (2013.01); *C21D 9/52* (2013.01); *C21D 9/525* (2013.01); *C22C 38/001* (2013.01); *C22C 38/02* (2013.01); *C22C 38/34* (2013.01); *C22C 38/40* (2013.01); *C22C 38/42* (2013.01); *C22C 38/44* (2013.01); *C21D 7/02* (2013.01); *C21D 8/065* (2013.01); *C21D 2211/001* (2013.01); *C21D 2211/008* (2013.01); *Y02P 10/253* (2015.11)

(56) References Cited

U.S. PATENT DOCUMENTS

| | | | | |
|---|---|---|---|---|
| 5,286,310 | A * | 2/1994 | Carinci | C22C 38/58 148/327 |
| 6,338,762 | B1 * | 1/2002 | Sato | C21D 6/004 148/325 |
| 2004/0121169 | A1 * | 6/2004 | Adachi | C21D 8/0205 428/465 |
| 2009/0202380 | A1 * | 8/2009 | Conrad | C21D 8/0205 420/49 |
| 2009/0314394 | A1 * | 12/2009 | Taulavuori | C21D 1/18 148/610 |
| 2010/0101686 | A1 | 4/2010 | Lu et al. | |
| 2012/0034126 | A1 * | 2/2012 | Nylof | C22C 38/001 420/38 |

FOREIGN PATENT DOCUMENTS

| | | | | |
|---|---|---|---|---|
| EP | 2072631 | A1 * | 6/2009 | ............ C21D 8/04 |
| EP | 2072631 | A1 | 6/2009 | |
| FR | 2864108 | A1 | 6/2005 | |
| GB | 1192934 | A | 5/1970 | |
| JP | 09-95757 | A | 4/1997 | |
| WO | WO 2005/019483 | A1 | 3/2005 | |

OTHER PUBLICATIONS

L.P. Karjalainen, et al., "Some Strengthening Methods for Austenitic Stainless Steels" Materials Technology, Steel Research Int. 79 (2008) No. 6, pp. 404-412.

International Search Report, issued in PCT/FI2012/050051, dated May 10, 2012.

Written Opinion of the International Search Authority, issued in PCT/FI2012/050051, dated May 10, 2012.

Schino et al. "Effects of the Grain Size on the Corrosion Behavior of Refined AISI 304 Austenitic Stainless Steels" Journal of Materials Science Letters 21, 2002, pp. 1631-1634.

Lindroos, Sulonen, Veistinen, Uudistettu Miekk-ojan Metallioppi, Teknillisten Tieteiden Akatemia, Kustannusyhtiö Otava, Keuruu 1986, s. 134, 388-389, 696-697.

* cited by examiner

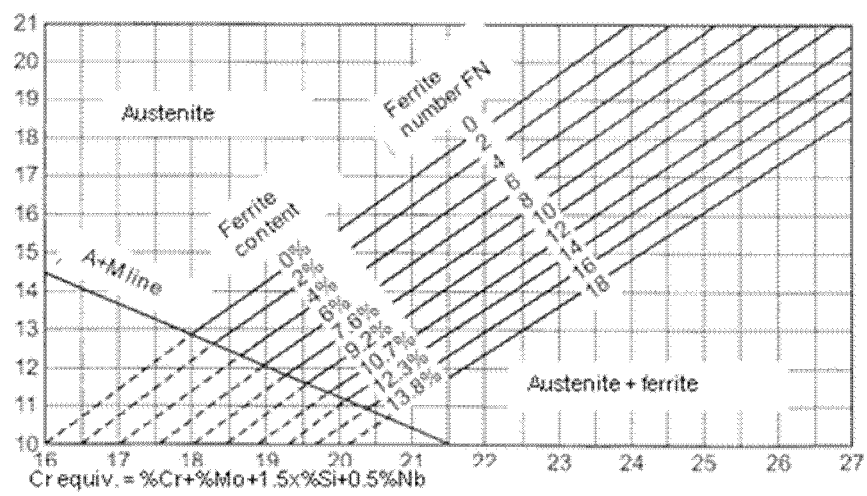

AUSTENITIC STAINLESS STEEL PRODUCT AND A METHOD FOR MANUFACTURING SAME

BACKGROUND OF THE INVENTION

The object of the invention is an austenitic stainless steel product, such as a strip, plate, sheet, bar or wire, manufactured from austenitic stainless steel.

The object of the invention is also a method for manufacturing a very strong austenitic stainless steel product, selected from the group consisting of a plate, a steel strip, a steel bar and steel wire wherein the steel product is cold-rolled and heat-treated.

The invention relates generally to austenitic stainless steels and to products manufactured from them, such as strips, plates, bars, wire, et cetera. The invention also relates to a method for elevating the strength of an austenitic stainless steel product by decreasing the grain size, while nevertheless preserving the good toughness properties characteristic to austenitic stainless steel. Stainless steels are usually divided into four main types: austenitic, ferritic, austenitic-ferritic (duplex) and martensitic stainless steels. Austenitic stainless steels, which typically contain at least 16% Cr (chromium) and typically 8-14% Ni (nickel), are well suited for applications in which high tensile strength, formability, weldability and good corrosion resistance are required.

Austenitic stainless steels can be classified into a number of sub-types, of which the two most important main types are AISI 304 and AISI 316 as well as the corresponding low-carbon steel grades AISI 304L and AISI 316L. An important difference in these is their chemical composition with respect to molybdenum. AISI 316 and AISI 316L contain approx. 2-3 percent molybdenum by weight, whereas molybdenum is not generally deliberately added to AISI 304 and AISI 304L steels. More particularly, resistance to pitting corrosion is essentially better with AISI 316 and AISI 316L steels than with AISI 304 and AISI 304L steels. The nickel content in the aforementioned Cr—Ni—Mo steels is typically between 10-14% and in Cr—Ni steels typically between 8-12%.

Most of the world's stainless steel is manufactured from raw steel and ferrochromium with the AOD method. The charge is smelted in an arc furnace (smelting unit) and the melt is treated in a converter (metallurgical unit). Decarburizing in the AOD converter occurs by blowing a mixture of oxygen and an inert gas (argon) into the melt. Decarburizing of the melt occurs in stages in such a manner that when reducing the carbon content the proportion of inert argon increases during the blowing. The treatment phases comprise, in addition to decarburizing, slag reduction with silicon, desulphurization and alloying. After the AOD process the melt is poured into a casting ladle, in which ladle treatment is performed. The purpose of this is to finish the composition of the steel and to adjust the temperature of the melt for the casting. The liquid steel is cast with a continuous casting machine.

The slabs made with continuous casting are hot-rolled into strips, which are heat-treated and pickled on continuous-action lines. The pickled hot strip is generally still cold-rolled to make it thinner and finally annealed and pickled. Acid treatment removes the oxide scale produced on the surface of the steel in heat treatment.

The surface of the pickled strip is matt-like. The surface of the strip can still be slightly skin-pass rolled, brushed or polished for achieving a different surface appearance.

In addition to strip, also other products, such as plate products, sheets, wire, bars, et cetera, are manufactured from stainless steel in a manner that is per se known in the art. Plate product manufacture, sheet manufacture, bar manufacture and wire manufacture have their own process phases, differing from strip manufacturing, which phases are per se known to a person skilled in the art, and they are not described in more detail in this context.

One disadvantageous property of austenitic stainless steels is considered to be their low strength, which has limited their use as a structural material. The yield strength ($R_{p0.2}$) of austenitic stainless steels at room temperature is usually between 230-300 MPa, whereas the yield strength of high-strength low-alloy steels (not stainless steels) can be twice or even quadruple that. The strength of stainless steel can be increased by cold-rolling, but when using it a significant part of the formability of the material is lost. Nowadays in the industrial manufacturing of stainless steels a high temperature, which is e.g. in the region of 1050° C., is used as the annealing temperature of the heat treatment following cold-rolling. In this case a grain size is reached, which is approx. 20 μm, as a result of the heat treatment. From this follows a rather low yield strength, which is typically less than 300 MPa.

One desired method of increasing the strength of stainless steels is to metallurgically reduce the average grain size of the metal. The conventional grain size is approx. 20 μm, but by reducing the grain size e.g. to approx. one-tenth, the yield strength could be doubled. The reason is that it has been proven that the yield strength of metals increases linearly as a function of the inverse value of the square root of the grain size. It has been possible to manufacture these types of so-called "ultra fine grain" (UFG) steels possessing a small grain size in laboratory conditions, but a viable and economic manufacturing process has not been found for these steels.

Solutions are known in which austenitic stainless steel is cold-rolled, in which case, especially when using steel grades containing unstable austenite, most of it changes in the cold-forming into extremely hard martensite. After this, heat treatment is performed on the steel to form a microstructure, which contains mainly very fine grained austenite produced with the so-called reversion mechanism from martensite and often also non-recrystallized austenite in the cold-formed state. Known from publication EP1899490 is a strip consisting of austenitic stainless steel, said strip having a certain chemical composition, and in the manufacturing of which alpha martensite (α'-martensite) produced in the shape deformation forms 50-90 percent by volume, the reduction ratio in the cold-rolling being 55-85%. According to the publication it is essential that the reduction ratio is sufficiently high for the amount of martensite forming to be sufficient for producing the required properties. In the publication in question, reversion annealing is then used to change the martensite into very fine-structured austenite. The martensite produced in cold-forming, however, has properties that make it undesirable. It is hard and brittle, in which case, especially when cold-forming a steel strip by rolling, the properties of martensite set limits to the reduction ratio and, on the other hand, to the durability of the rolling equipment used.

One aim of the invention is to achieve a completely new type of austenitic stainless steel product, by means of which the weaknesses of current stainless steel products can be improved. Another aim of the invention is to achieve a method for elevating the strength of an austenitic stainless steel product by decreasing its grain size while at the same time preserving well the good toughness characteristic to austenitic stainless steel. Yet another aim is to achieve a solution, by means of which the drawbacks of prior art are avoided.

BRIEF DESCRIPTION OF THE INVENTION

The austenitic stainless steel product, is a strip, plate, sheet, bar or wire, manufactured from austenitic stainless steel.

The method according to the invention produces a very strong austenitic stainless steel product, selected from the group consisting of a plate, a steel strip, a steel bar and steel wire wherein the steel product is cold-rolled and heat-treated.

A steel applicable for use in the invention is such that it contains sufficiently stable austenite, which does not easily change to martensite in cold-forming, martensite being disadvantageous from the standpoint of the invention. Sufficiently robust cold-forming is performed on a suitable steel and a suitable lower annealing temperature than the annealing temperature nowadays used in industry is selected, in which case the desired small grain size and desired advantageous mechanical properties are achieved.

The solution according to the invention has a number of important advantages. A structure is achieved for the steel product according to the invention with treatment according to the invention, the grain size of which steel product is advantageous, so that a higher yield strength than today's commercial grades and good preservation of toughness are achieved. The yield strength is obtained at the desired level when suitable parameters are selected for the cold-forming and for the annealing following it. With respect to the steel product according to the invention, a steel is used that has sufficiently stable austenite, which does not easily change to hard martensite in cold-forming, in which case the cold-forming phase is, with regard to the material, advantageous to the cold-forming equipment used and to the durability of said equipment. Heat treatment after the cold-forming, i.e. the annealing to be performed for achieving recrystallization, is performed at an essentially lower temperature than currently. The grain size to be achieved with this method is only approx. one-tenth of the grain size of today's commercial austenitic stainless steels. In addition, a low annealing temperature means a thinner oxide layer (scale) on the surface of the steel. In this case milder/faster acid treatment than currently is sufficient for the further treatment, which means cost savings and is advantageous from the viewpoint of the environment. In addition, a low annealing temperature saves energy and the furnace structures.

The solution according to the invention has a number of important advantages also in many applications, e.g. in the automotive and transportation industry, in shipbuilding, in the pressure equipment manufacturing sector of the engineering industry and also as a structural steel, e.g. in the support structures of bridges and buildings and in other sites where strength and good corrosion resistance is required of a material. In the automotive industry these types of steels can be used in support structures to be formed, in which both strength and corrosion resistance are needed. When used in the structures of an automobile that require corrosion resistance and strength, the solution according to the invention results in a lightweight and corrosion-resistant structure and therefore in improved fuel economy of the automobile as well as in a longer service life of the parts. The solution according to the invention is more environmentally friendly than current solutions and reduces manufacturing costs, because it eliminates the need to use anticorrosion chemicals that are harmful to the environment in the coatings of structures and it also reduces the work phases in manufacturing and significantly reduces the wear of tools used in forming. In pressure devices, often excellent corrosion resistance, formability and weldability are needed, in addition to strength. Steels according to the invention reduce the manufacturing costs of pressure devices, enable the manufacture of thinner and thus lighter pressure devices also in structures requiring corrosion resistance, in this way producing savings in materials, weight and, in respect of pressure devices used in vehicles, also fuel consumption and higher payload. The steels according to the invention also enable the use of stainless steel in the support structures of the construction industry, producing savings owing to their longer service life, particularly in sites susceptible to corrosion. In shipbuilding, with the solution according to the invention the need to use coatings harmful to the environment is significantly reduced. As a result of lighter structures than currently, also the transportation capacity of ships increases, fuel consumption decreases and emissions into the environment per tonne of freight carried decrease. In addition, the strong austenitic stainless steels according to the invention give designers the possibility to create lighter structures than before in any sites whatsoever where, in addition to the strength of the material, good formability and good corrosion-resistance properties are useful.

BRIEF DESCRIPTION OF THE FIGURES

In the following, the invention will be described in more detail by the aid of some embodiments with reference to the attached drawing, wherein FIG. 1 presents a DeLong diagram, which is per se known in the art.

DETAILED DESCRIPTION OF THE INVENTION

In the invention the cold-forming and the heat treatment following it are examined in respect of the manufacture of an austenitic stainless steel product, such as a strip, plate, wire or bar. In the following, the term "strip" is mainly used, which also includes insofar as is applicable other steel products as an object of the invention. The slabs made with continuous casting are hot-rolled into strips, which are heat-treated and pickled typically on continuous-action lines. The pickled hot strip is generally cold-formed to make it thinner and finally annealed and pickled.

The method according to the invention is suited to both hot-rolled and cold-rolled steels.

A steel applicable for use in the invention is such that it contains sufficiently stable austenite, which does not easily change to martensite in cold-forming. The amount of martensite after cold-forming is at least less than 50%, most suitably less than 30%. A large amount of martensite would result in disadvantageous properties, such as the slow recrystallization of cold-formed austenite, the heterogeneous microstructure of the end product and the poor toughness of the end product. In addition, owing to its hardness the martensite forming during cold-forming would be disadvantageous to the rolling mills to be used in cold-forming, the durability and cold-forming stage of which rolling mills the large amount of martensite would detrimentally affect.

The invention is based on recrystallization that is as comprehensive as possible of cold-rolled austenitic stainless steel. When a suitable steel grade is used, on which adequate cold-forming and appropriate annealing using a suitably low annealing temperature are performed, a steel product with advantageous properties is achieved.

The invention thus relates to a steel product, such as a strip, plate, sheet, bar or wire, manufactured from austenitic stainless steel, of which product
- a—the average grain size of the recrystallized austenitic structure is at most 6 μm,
- b—less than 50% of the structure is non-recrystallized, i.e. unrecrystallized, austenite
- c—the yield strength ($R_{p0.2}$) is at least 350 MPa,
- d—the tensile strength ($R_m$) is at least 600 MPa, and
- e—the uniform elongation (Ag) is at least 5%, depending on the strength.

According to one embodiment the average grain size of the recrystallized structure is preferably 0.5-5 μm, most preferably 1-4 μm.

According to one embodiment the yield strength ($R_{p0.2}$) of the steel product is at least 400 MPa, preferably at least 500 MPa.

According to one embodiment the tensile strength ($R_m$) of the steel product is at least 650 MPa, preferably at least 720 MPa.

According to one embodiment the uniform elongation (Ag) of the steel product is at least 10%, most preferably at least 20%.

According to one embodiment less than 25% of the structure of the steel product is non-recrystallized austenite.

According to one embodiment the chemical composition of the steel product fulfills the following relationship:

$$\text{Ni equiv.}=1\times\% \text{ Ni}+30\times\% \text{ C}+30\times\% \text{ N}+0.5\times\% \text{ Mn} \geq 9.0$$

According to one embodiment the chemical composition of the steel product fulfills the following relationship:

$$\text{Cr equiv.}=1\times\% \text{ Cr}+1\times\% \text{ Mo}+1.5\times\% \text{ Si}+0.5\times\% \text{ Nb} \geq 17.0$$

According to one embodiment the steel product contains as alloying elements in percentages by weight:
- carbon, C≤0.3%
- silicon, Si≤0.3%
- manganese, Mn≤21%
- 15≤chromium, Cr≤28%
- nickel, Ni≤26%
- molybdenum, Mo≤8.0%
- copper, Cu≤4.0%
- nitrogen, N≤0.80%.

According to one embodiment the steel product can advantageously in addition contain one or more of the following alloying elements, in percentages by weight:
- phosphorus, P≤0.30%
- sulphur, S≤0.30%
- niobium, Nb≤1.2%
- tantalum, Ta≤1.2%
- titanium, Ti≤1.0%
- selenium, Se≤1.0%
- tellerium, Te≤1.0%
- vanadium, V≤1.0%

The remainder of the steel is iron and possible impurities originating from the raw materials and the manufacturing.

According to one embodiment the steel product is manufactured with one of the methods presented below.

The invention also relates to a method for the manufacturing of a very strong austenitic stainless steel product, such as a steel plate, a steel strip, a steel bar or steel wire, in which method the steel plate, steel strip, steel bar, or steel wire is cold-formed and heat-treated. In the method
- a—the steel is cold-formed
- b—the total reduction ratio of the cold-forming is at least 50%
- c—less than 50% of the volume of the austenitic stainless steel changes into martensite during the cold-forming
- d—the cold-formed steel product is heat-treated for recrystallizing its structure, in which case the annealing temperature is 650-940° C. and the annealing time (i.e. holding time) at most 30 min.

According to one embodiment the steel is cold-formed such that the total reduction ratio of the cold-forming is preferably 65-93%.

According to one embodiment the steel is cold-formed such that preferably at most 30% of the volume of the austenite changes into martensite during the cold-forming.

According to one embodiment the cold-formed steel product is heat-treated for recrystallizing its structure such that the annealing temperature is preferably 650-900° C.

According to one embodiment the cold-formed steel product is heat-treated for recrystallizing its structure such that the annealing temperature is preferably 700-890° C.

According to one embodiment the annealing time is preferably 20 s-3 min.

According to one embodiment the steel is heated to the annealing temperature, or to the proximity of it, at a heating rate which is greater than 10° C./s, preferably greater than 100° C./s, e.g. using induction heating. The heating rate can thus be considerably greater than 10° C./s, such as e.g. 100° C./s or 200° C./s, or even greater than these.

According to one embodiment the cold-forming is cold-rolling, more particularly when steel strip, steel plate is manufactured, and cold-drawing, more particularly when wire is manufactured.

According to one embodiment a method according to any of the aforementioned embodiments is used in the manufacturing of the steel product.

The alloying elements of the steel product to be used in the invention can be evaluated e.g. by means of the DeLong diagram presented in FIG. 1, wherein the X-axis shows the so-called chromium equivalent (Cr equiv.) and the Y-axis the so-called Nickel equivalent (Ni equiv.). With the DeLong diagram it is possible to forecast the effect of the chemical composition on the microstructure of the stainless steel. The nickel equivalent takes into account the effect of the alloying elements stabilizing the austenite and the chromium equivalent takes into account the effect of alloying elements favoring ferrite on the structure.

In FIG. 1:

$$\text{Ni equiv.}=\% \text{ Ni}+30\times\% \text{ C}+30\times\% \text{ N}+0.5\times\% \text{ Mn}$$

$$\text{Cr equiv.}=\% \text{ Cr}+\% \text{ Mo}+1.5\times\% \text{ Si}+0.5\% \text{ Nb}$$

We can take, by way of example, a steel for which the contents are: for chromium equivalent 18% Cr-0.5% Si-0.2% Mo-(0.0% Nb), in which case Cr equivalent is 18+0.2+1.5×0.5+0.5×0.0=18.95 i.e. approx. 19; and the contents for the nickel equivalent are 10% Ni-0.04% C-0.03% N-1.8% Mn, in which case the Ni equivalent is 10+30× 0.04+30×0.03+0.5×1.5=13.0 i.e. the Ni equivalent is 13. It can be seen from the diagram that if the value of the chromium equivalent (Cr equiv.) is approx. 19 and the value of the nickel equivalent (Ni equiv.) is approx. 13, then when the molten steel has solidified the structure is austenite, which contains approx. 3.5% ferrite.

By means of the DeLong diagram, therefore, the composition ranges of a steel can be defined quite accurately and in a generally accepted manner. The diagram takes into account also those types of situations in which nickel is wholly or partially replaced with manganese or nitrogen in the contents of a steel. The DeLong diagram was originally drafted for describing the solidifying structure of a molten weld pool, but it is also suited for use in steel production.

The aim of one embodiment of the invention is that there would be at most in the region of 15% ferrite in the solidified steel. It is possible to remove such an amount of ferrite in later treatments in the steel mill. The structure of the steel product, such as steel strip/steel plate, to be sold is generally almost solely austenite (non-magnetic) with a ferrite content of at most in the region of 1%. Another aim is that the contents of the chemical composition of the steel product do not go below the A+M (austenite+martensite) line of the DeLong diagram of FIG. 1, because hard and brittle martensite starts to be formed there.

According to one embodiment of the invention the bottom limit for chromium equivalent (Cr equiv.) is e.g. 17.0 and the bottom limit for nickel equivalent (Ni equiv.) is 9.0 (i.e. as per the graduation in FIG. 1 below).

It is possible that in the future e.g. nickel would not be used at all, or that it would be used very little, e.g. owing to its expensiveness. In this case e.g. a 6-15% setting for the Nickel content in the specification of the austenitic stainless steel to be used in the invention is from the standpoint of the invention an inadequate specification. The amount of chromium (Cr content) is per se better controllable, because the corrosion resistance is often almost exclusively determined according to the chromium content. In view of this, by means of the nickel equivalent of the DeLong diagram a suitable limit value can be determined also for a type of austenitic stainless steel in which the amount of nickel is smaller than today's contents. The calculated values of chromium equivalent and nickel equivalent of the steel grades used in the embodiments of the invention are presented in Table 4.1.

The reduction ratio of the cold-forming according to the invention is typically rather high, in which case when the cold-forming of a continuous strip is involved, the cold-forming can be performed in practical production with a Sendzimir rolling mill (Z-mill) or with a number of consecutive rolling mills of the manufacturing line (tandem cold mill).

More robust rolling is used compared to the cold-rolling of ordinary stainless steel and typically an appreciably lower annealing temperature compared to ordinarily. In addition, extremely fast heating can be used in the annealing (typically a heating rate which is greater than 10° C./s, preferably greater than 100° C./s), such as induction heating, as a result of which the accuracy of the heat treatment can be improved in respect of both the annealing time and the annealing temperature.

Example 1

Strip manufactured from austenitic stainless steel SS 18/10 (304L), the thickness of which is initially 4 mm, containing a chemical composition according to the composition stated in Table 1.1 in addition to iron and non-specified impurities, was treated according to the invention to achieve improved formability and high strength. The austenitic strip was cold-formed by cold-rolling used the degrees of reduction of Table 1.2. At the same time the amount of martensite formed was determined using a Ferritescope MP30 measuring device (Fischer Instrumentation (G.B.) Ltd.) intended for measuring ferrite content. The readings obtained in the measurement were multiplied by 1.7, which is verified to have given the correct martensite content. It can be stated that even with a large reduction ratio the amount of martensite formed is rather low.

Next, heat treatment was performed for the test pieces with a 75% reduction ratio. Heat treatment was performed at five different temperatures: 670° C., 700° C., 750° C., 800° C. and 950° C. From Table 1.3 it is seen that with the heating rate of 200° C./s used and with all the annealing temperatures of 800° C. and below, with the annealing time, i.e. holding time, being 10 min, all the samples fulfilled the values set as the aim of the invention in relation to yield strength, tensile strength, grain size and elongation to fracture. When the annealing temperature was higher, 950° C., it could be observed that grain size grew with the steel used to be larger than desired and not quite optimal properties were achieved.

Table 1.4 further presents heating of the same austenitic stainless steel at the different heating rates 10, 30, 50, 100, 200° C./s to an annealing temperature of 750° C., the annealing time, i.e. holding time, being 2 min. It was observed that with a higher heating rate the grain size formed to be slightly smaller, and that being the case more advantageously, than with a slower heating rate. In addition, by comparing the results presented in Table 1.4 to the results in Table 1.3, in which the holding time was 10 minutes, it was observed that a shorter holding time reduced the grain size to some extent and improved the yield strength.

It was observed in the tests that a larger reduction ratio (75>85%) gives a smaller grain size (2.5→2 μm) and a higher yield strength (approx. 530→approx. 600 MPa). The annealing temperature was in this case 750° C. Thus also with the pieces of larger reduction ratio the mechanical properties that are the aim of the invention were achieved well. The grain sizes were slightly smaller and the yield strength to some extent higher than in the case of a smaller reduction ratio (75%).

The effect of the reduction ratio on the end result was further examined. It can be seen from Table 1.5, from the column on the right-hand side of it, that with a total reduction ratio of below 50% recrystallization does not occur sufficiently or does not occur at all. With 30% total reduction ratio, the non-recrystallized structure is 99%. With 50% total reduction ratio, the non-recrystallized structure is 50% of the structure. With 75% total reduction, the non-recrystallized structure is only 3% of the structure, i.e. almost all the structure is recrystallized.

The degree of recrystallization and the grain size were determined using an optical microscope. In defining the proportion of non-recrystallization, the non-recrystallized surface area was compared to the surface area of the whole field of view of the microscope. The average grain size was determined with the mean linear intercept method.

TABLE 1.1

Composition (% by weight) of steel SS18/10 (test pieces A304 and LK304). Original grain size approx. 25 μm.

| C | Si | Mn | P | S | Cr | Ni |
| --- | --- | --- | --- | --- | --- | --- |
| 0.024 | 0.72 | 1.60 | 0.027 | 0.002 | 18.2 | 10.2 |

TABLE 1.2

Effect of reduction ratio of cold-forming on the formation of martensite.

| Reduction ratio (%) | Thickness (mm) | Martensite (%) |
|---|---|---|
| 0 | 4.0 | 0 |
| 30 | 2.8 | 1.3 |
| 50 | 2.0 | 2.9 |
| 75 | 1.0 | 5.9 |
| 85 | 0.6 | 14.0 |

TABLE 1.3

Effect of annealing temperature on the mechanical properties of the test pieces, on the average grain size of the recrystallized structure, and on the amount of non-recrystallized austenite. The total reduction ratio of cold-rolling before annealing was 75%.

| Sample | Heating rate, [° C./s] | Annealing temperature, [° C.] | Holding time, [min] | Yield strength, Rp0.2 [MPa] | Tensile strength, Rm [MPa] | Uniform elongation Ag [%] | Elongation to fracture At [%] | Grain size [µm] | Non-recrystallized, % |
|---|---|---|---|---|---|---|---|---|---|
| A304 1A | 200 | 670 | 10 | 874 | 1029 | 10 | 22 | 1.0 | 35 |
| A304 1B | " | 670 | " | 870 | 1019 | 10 | 23 | | |
| A304 2A | " | 700 | " | 692 | 858 | 23 | 34 | 1.5 | 10 |
| A304 2B | " | 700 | " | 608 | 838 | 27 | 37 | | |
| A304 3A | " | 750 | " | 468 | 752 | 37 | 48 | 2.9 | 2 |
| A304 3B | " | 750 | " | 474 | 751 | 39 | 49 | | |
| A304 4A | " | 800 | " | 421 | 728 | 41 | 52 | 5.0 | — |
| A304 4B | " | 800 | " | 410 | 729 | 42 | 53 | | |
| A304 5A | 8 | 950 | 1 | 314 | 677 | 46 | 58 | 10.4 | — |
| A304 5B | " | 950 | " | 315 | 681 | 47 | 58 | | |

TABLE 1.4

Effect of heating rate used in annealing on properties of end product.

| Sample | Heating rate [° C./s] | Annealing temperature [° C.] | Holding time [min] | Yield strength, Rp0.2 [MPa] | Tensile strength, Rm [MPa] | Uniform elongation Ag [%] | Elongation to fracture At [%] | Grain size [µm] | Non-recrystallized [%] |
|---|---|---|---|---|---|---|---|---|---|
| LK304 1B | 10 | 750 | 2 | 512 | 774 | 36 | 48 | 3.1 | 6 |
| LK304 1C | 10 | " | " | 532 | 801 | 33 | 44 | | |
| LK304 2A | 30 | " | " | 558 | 832 | 36 | 49 | | |
| LK304 2B | 30 | " | " | 521 | 792 | 35 | 47 | 2.5 | 8 |
| LK304 3A | 50 | " | " | 534 | 791 | 36 | 47 | | |
| LK304 3B | 50 | " | " | 536 | 789 | 35 | 48 | 2.8 | 7 |
| LK304 4A | 100 | " | " | 538 | 785 | 34 | 47 | | |
| LK304 4B | 100 | " | " | 529 | 785 | 35 | 47 | 2.5 | 6 |
| LK304 5A | 200 | " | " | 525 | 775 | 36 | 48 | | |
| LK304 5B | 200 | " | " | 540 | 796 | 36 | 48 | 2.5 | 3 |

TABLE 1.5

Effect of reduction ratio on end product. Heating rate 200° C./s.

| Sample | Total reduction ratio [%] | Annealing temperature [° C.] | Holding time [min] | Yield strength Rp0.2 [MPa] | Tensile strength Rm [MPa] | Uniform elongation Ag [%] | Elongation to fracture At [%] | Grain size [µm] | Non-recrystallized [%] |
|---|---|---|---|---|---|---|---|---|---|
| LK304 8A | 30 | 750 | 2 | 687 | 850 | 19 | 43 | | |
| LK304 8B | 30 | " | " | 684 | 849 | 19 | 43 | — | 99 |
| LK304 7A | 50 | " | " | 624 | 851 | 22 | 43 | | |
| LK304 7B | 50 | " | " | 650 | 866 | 22 | 43 | 3.5 | 50 |
| LK304 5A | 75 | " | " | 525 | 775 | 36 | 48 | | |
| LK304 5B | 75 | " | " | 540 | 796 | 36 | 48 | 2.5 | 3 |

Example 2

The suitability of austenitic stainless steel SS18/8 (AISI 304L) for the treatment according to the invention was tested. Austenitic stainless steel, which contained 18.2% by weight chromium, 8.2% by weight nickel, 1.65% by weight manganese, 0.40% by weight silicon, 0.45% by weight copper, 0.050% by weight nitrogen and 0.022% by weight carbon, in addition to iron and non-specified impurities, was cold-formed by rolling to a total reduction ratio of 80%. After this the test piece was heat-treated, the heating rate being 200° C./s, the annealing temperature being 800° C. and the annealing time, i.e. the holding time, being 2 minutes. After treatment 539 MPa was obtained for yield strength ($R_{p0.2}$) and 784 MPa for tensile strength ($R_m$). The toughness of the material measured with uniform elongation (Ag) was 34% and elongation to fracture (At) was 50%. The grain size was 2.5 μm and the proportion of non-recrystallization was 2%. It can be asserted that a steel product fulfilling the desired properties was obtained.

The austenite of this steel was more unstable than with the 18/10 steel according to Example 1, and in cold-rolling a significant part (28%) of the austenite changes into martensite. When the annealing temperature was below 800° C., the cold-formed austenite of steel SS 18/8 recrystallized more slowly than the cold-formed austenite of steel SS 18/10. At the same time the proportion of non-recrystallized austenite in the final structure of steel SS 18/8 increases and the heterogeneity of the microstructure increases. Thus, this steel requires a higher annealing temperature than steel SS 18/10 for a good strength/toughness combination to be achieved.

Example 3

The suitability of austenitic stainless steel SS17/12/3 (AISI 316L) for the treatment according to the invention was tested. Austenitic stainless steel strip, which contained 17.3% by weight chromium, 11.8% by weight nickel, 2.67% by weight molybdenum, 1.74% by weight manganese, 0.42% by weight silicon, 0.28% by weight copper, 0.032% by weight nitrogen and 0.022% by weight carbon, in addition to iron and non-specified impurities, was cold-formed by rolling with a total reduction ratio of 80%. After this the test piece was heat-treated, the heating rate being 200° C./s, the annealing temperature being 840° C. and the annealing time, i.e. the holding time, being 2 minutes. After treatment 571 MPa was obtained for yield strength $R_{p0.2}$, 814 MPa for tensile strength $R_m$. The toughness of the material measured with uniform elongation (Ag) before reduction was 41% and elongation to fracture at the time of fracture of a test rod (At) was 56%. The grain size was 2.5 μm and the proportion of non-recrystallization was 10%. It could be asserted that results obtained indicate that a steel product fulfilling the desired properties was obtained.

According to the tests and measurements, about one-half of the cold-rolled austenite had time to recrystallize during annealing performed at 800° C. Correspondingly, the recrystallization of SS18/10 steel is at that temperature complete and almost complete at an annealing temperature of 750° C.

Example 4

Reference is made here to Table 4,1, in which the chromium equivalents (Cr equiv.) and the nickel equivalents (Ni equiv.) of the DeLong diagram are calculated for the steels used in the tests.

Ni equiv.=1×% Ni+30×% C+30×% N+0.5×% Mn

Cr equiv.=1×% Cr+1×% Mo+1.5×% Si+0.5×% Nb

TABLE 4.1

Chromium equivalent values and nickel equivalent values according to DeLong diagram of steel grades used in the tests.

| Steel | Ni equiv. | Cr equiv. |
|---|---|---|
| SS18/10 (AISI 304L) | 12.8 | 19.4 |
| SS18/8 (AISI 304L) | 11.2 | 18.8 |
| SS17/12/3 (AISI 316L) | 14.3 | 20.6 |

Used in the examples were test arrangements in which the original steel sheet was thinned with a laboratory rolling mill at room temperature to the desired reduction ratio.

Tests pieces 20×160 mm in size were detached from the cold-rolled sheet by cutting in the direction of the cold-rolling of the sheet. The center area of the test pieces was heated and annealed resistively with a Gleeble®1500 thermomechanical simulator using the test parameters stated. The cooling speed was approx. 100° C./s.

Tensile test specimens were made from rectangularly-shaped sheets, the test length of said specimens being 15 mm, the original gage length being 10 mm, the width 6 mm and the corner radius of the shoulder 12 mm. The tensile tests were conducted with a Zwick/Z100 tensile testing machine.

It is obvious to the person skilled in the art that the invention is not limited to the embodiments presented above, but that it can be varied within the scope of the claims presented below. The characteristic features presented in the description mentioned in conjunction with each other can also be independent characteristic features.

The invention claimed is:

1. A method for the manufacturing of a very strong austenitic stainless steel product, selected from the group consisting of a plate, a steel strip, a steel bar and steel wire wherein the steel product is cold-rolled and heat-treated, comprising the following steps:
    a—cold-rolling the steel;
    b—providing a total reduction ratio of the cold-rolling to be at least 50%;
    c—changing at most 30% of the volume of the austenitic stainless steel into martensite during the cold-rolling; and
    d—heat-treating the cold-rolled steel product for recrystallizing its structure, in which case the annealing temperature is higher than 670° C. and lower than 950° C. and the annealing time is at most 10 minutes,
    wherein the tensile strength ($R_m$) of the steel product is greater than 600 MPa and less than 1000 MPa,
    wherein the chemical composition of the steel fulfills the following relationship:

Ni equiv.=1×% Ni+30×% C+30×% N+0.5×% Mn≥9.0 and

Cr equiv.=1×% Cr+1×% Mo+1.5×% Si+0.5×% Nb≥17.0, wherein the steel has C≤0.03 wt %, and
    wherein the average grain size of the recrystallized austenitic structure is at most 6 μm,
    wherein less than 25% of the structure is non-recrystallized austenite,
    wherein the yield strength ($R_{p0.2}$) is at least 350 MPa, and the uniform elongation (Ag) is at least 5%.

2. The method according to claim 1, wherein the steel is cold-rolled such that the total reduction ratio of the cold-rolling is in the range of 65-93%.

3. The method according to claim 1, wherein the cold-rolled steel product is heat-treated for recrystallizing its structure such that the annealing temperature is in the range of 700–890° C.

4. The method according to claim 1, wherein the annealing time is in the range of 20 s-3 min.

5. The method according to claim 1, wherein the steel is heated to the annealing temperature, or to the proximity of it, at a heating rate which is greater than 10° C./s.

6. The method according to claim 1, wherein cold-rolling occurs when steel strip, steel plate is manufactured.

7. The method according to claim 1, wherein the steel is cold-rolled such that at most 14% of the volume of the austenite changes into martensite during cold-rolling.

8. The method according to claim 1, wherein the steel is heated to the annealing temperature, or to the proximity of it, at a heating rate which is greater than 100° C./s, using induction heating.

9. The method according to claim 1, wherein the tensile strength (Rm) of the steel product is greater than 677 MPa and less than 1000 MPa.

10. The method according to claim 1, wherein the tensile strength (Rm) of the steel product is in the range of greater than 677 MPa to 858 MPa.

11. The method according to claim 1, wherein its uniform elongation (Ag) is at least 10%.

* * * * *